(No Model.)
A. W. PARIS.
REFRIGERATOR.
No. 423,946. Patented Mar. 25, 1890.
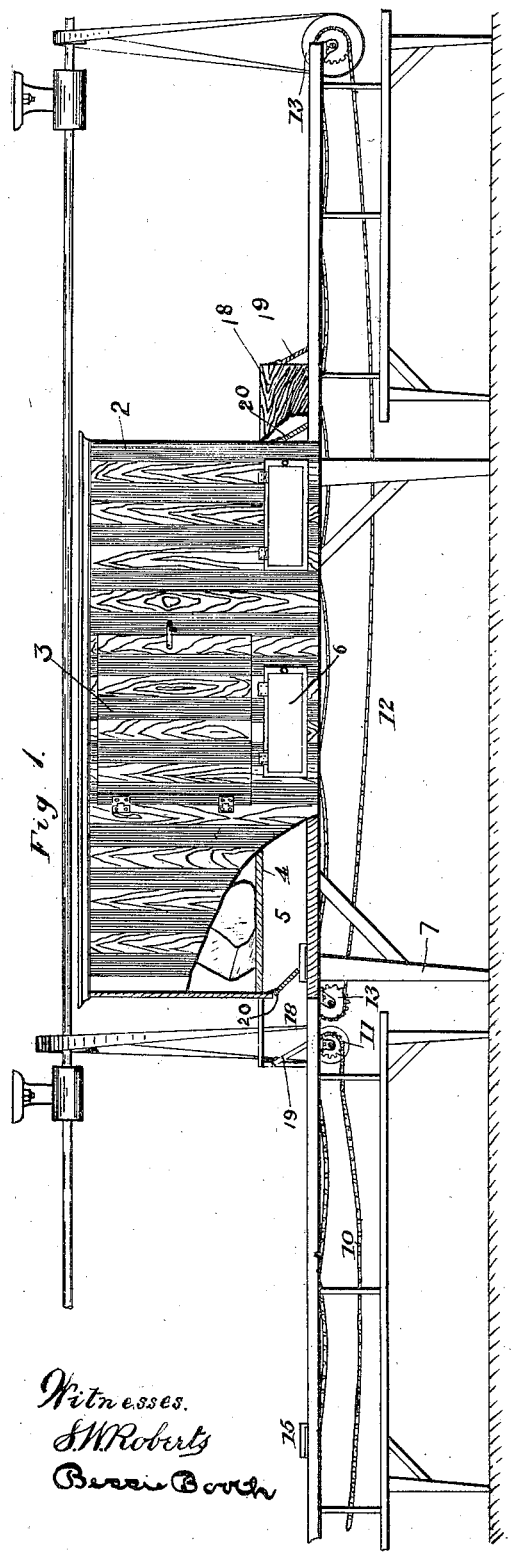
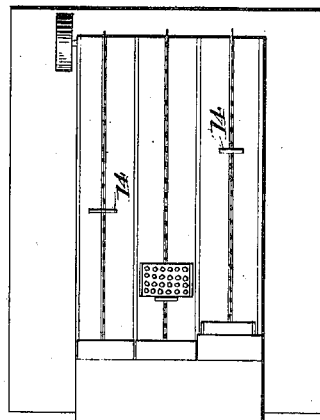
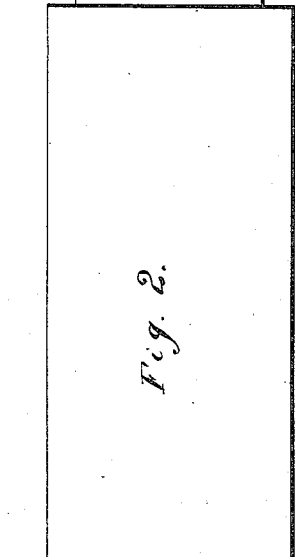
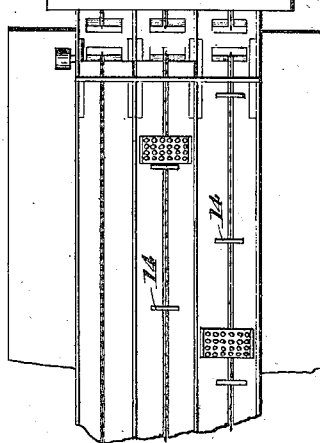
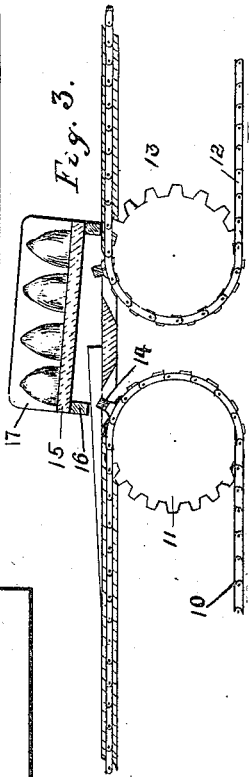
Witnesses.
S. W. Roberts
Bessie Booth
Inventor.
A. W. Paris.
By Paul Merwin Att'ys.

UNITED STATES PATENT OFFICE.

ALFRED W. PARIS, OF MINNEAPOLIS, MINNESOTA.

REFRIGERATOR.

SPECIFICATION forming part of Letters Patent No. 423,946, dated March 25, 1890.

Application filed August 26, 1889. Serial No. 322,036. (No model.)

*To all whom it may concern:*

Be it known that I, ALFRED W. PARIS, of Minneapolis, in the county of Hennepin and State of Minnesota, have invented certain Improvements in Refrigerators, of which the following is a specification.

My invention relates to improvements in refrigerators used in candy-manufacturing for the purpose of cooling the candy as manufactured; and it consists in arranging an air-chamber in the refrigerator, through which the candy is carried automatically at any desired speed, so as to regulate the time during which it remains in the chamber. As ordinarily constructed, such refrigerators are so arranged that it is necessary for an attendant either to remain in the cold-air chamber or continually pass in and out in caring for the goods. This is objectionable for several reasons. The frequent opening of the door of the chamber allows warm air to enter it, whereby its temperature is raised, so that the supply of ice is wasted, and besides the exposure of the person to the low temperature is injurious to health, and the length of the cooling process for the goods is variable and so unequal as to be unsatisfactory in results. By the use of my improved invention all these objections are obviated. The cold-air chamber is opened to the outer air only in the passing of the trays of candy in and out through flap-doors protected by an outer chamber with a similar door, which is closed while the inner door is open, so that the wasting of the supply of ice is reduced to the minimum, and by adjusting the speed of travel of the carrier through the chamber the length of time the goods are subjected to the cooling process may be fixed as desired.

In the accompanying drawings, forming a part of this specification, Figure 1 represents a side elevation of my improved refrigerator, the side wall being partly broken away to show the arrangement of the cold-air chamber and flap-doors. Fig. 2 is a plan view of the bottom of the cooling-chamber and carrying-belts. Fig. 3 is a detail showing the manner in which a tray is delivered by the fast outside belt to the slow belt inside, and Fig. 4 is a detail of the candy-tray.

In the drawings, 2 represents the ice-box, of usual form and construction, having a suitable door 3 for receiving blocks of ice, and a false bottom 4, forming the cold-air chamber 5. This chamber is provided, preferably, with glazed openings 6, through which the contents can be seen. Suitable standards 7 support the structure. Extending from one end of the refrigerator and supported on suitable standards 9 is the "way" 8, in which is arranged one or more endless belts 10, carried over the wheels or drums 11 at either end of the way and driven by any convenient power connected to one of said drums. Similarly arranged in the bottom of the cooling-chamber is the belt or belts 12, carried upon the drums 13. Arranged at suitable intervals upon said belts are the transverse cleats 14, projecting above the level of the way and the bottom of the cooling-chamber. For the purpose of receiving and conveying the candy as manufactured into the refrigerator trays 15 are provided, of convenient size to hold any desired amount of candy and adapted to be placed upon the way over the belt 10, there to be engaged by the cleats 14 and moved forward along the way. The adjacent ends of the belts 10 and 12 are arranged as closely together as possible, so that each tray as delivered by the belt 10 is in position to be caught by a cleat of the belt 12 and carried forward by it, the tray being provided with supporting cross pieces or cleats 16 at either end, either of which can be engaged by a belt-cleat.

In order that the tray may be forced from the cleat of the belt at the end of its travel, I prefer to arrange a slight incline 17, up which the tray slides until raised above the cleat, which then passes underneath it, and is carried downward around the belt-drum, the forward end of the tray dropping down over the second belt in position for its front support to be engaged by a cleat of the second belt, as shown in Fig. 3. The end of the belt 10 is carried close to the refrigerator, and covered, preferably, by one of the outer chambers 18, into which it delivers the trays carried by it, the flap-door 19 being arranged to be opened by the tray in entering and to close of its own weight behind it. A similar flap-door 20, arranged in the end of the cooling-chamber, allows the tray to enter the cooling-chamber as carried forward by the belt 12. By this means only one of the flap-doors is open at any one time, thus preventing a rush of warm air into the cooling-chamber.

I prefer to drive the belt 10 much faster than the belt 12, so that the candy is carried quickly into the cooling-chamber, through which it is conveyed slowly enough to cool the goods as much as desired. The other chamber 18, arranged at the opposite end of the cooling-chamber, prevents the inlet of heated air. It is obvious that the cooling process can thus be controlled accurately and to such degree as may be necessary for various kinds of goods other than candy which require similar treatment.

While I have shown and described and prefer to use a cooling-chamber arranged in the the bottom of an ice-box or refrigerator, it is obvious that the chamber may be arranged, if desired, in a different manner in said refrigerator—as, for example, centrally in the same—and that other means than the use of ice may be employed for reducing the temperature of said chamber, if preferred, as by a system of cooling-pipes or of chemicals or other known devices.

I claim—

1. In a device of the class described, the combination, with a cooling-chamber, of a continuously-running low-speed conveyer arranged therein, self-closing entrance and exit doors arranged in the walls of said chamber, a continuously-running high-speed conveyer arranged outside said chamber adapted to deliver articles through the entrance-doors to the said conveyer, a tray adapted to receive the articles to be carried through said chamber upon said conveyers, and projections upon said conveyers engaging with said tray and propelling the same, as and for the purpose set forth.

2. In a device of the class described having a cooling-chamber, a continuously-running low-speed conveyer within the same, a continuously-running high-speed conveyer arranged outside said chamber and adapted to deliver its load to said inside conveyer, both said conveyers being provided with projections adapted to engage an object placed upon the same, a receptacle or tray adapted to receive articles to be passed through said chamber, having front and rear-bottom cleats adapted to be engaged by the projections on said conveyers, by means of which, as the outside conveyer, engaging with the rear cleat, delivers said tray from it, the front cleat is in position to be engaged by the other conveyer, combined and adapted to be operated substantially as described.

3. In a device of the class described, the combination, with the cooling-chamber having self-closing doors for the passage of articles through said chamber, of a continuously-running low-speed conveyer arranged in said chamber, having a series of transverse cleats, and adapted to convey articles from one of the doors of said chamber through the other, a continuously-running high-speed conveyer arranged outside of said chamber, having transverse cleats, and adapted to convey articles into said chamber and deliver the same to the conveyer arranged therein, substantially as and for the purposes set forth.

4. In a device of the class described, the combination, with a cooling-chamber having self-closing doors, of a continuously-running conveyer arranged therein, a continuously-running conveyer arranged outside thereof and adapted to convey articles to said conveyer arranged in said chamber, transverse cleats arranged upon said conveyer, and a tray adapted to receive the articles to be conveyed through said chamber, having a transverse cleat arranged on the under side at either end thereof adapted to be engaged by the cleats on said conveyers, whereby as said tray is delivered from said outside conveyer by means of a cleat on said conveyer engaging the rear cleat on said tray the forward cleat of said tray will be in position to be engaged by a cleat upon said inside conveyer, substantially as and for the purposes set forth.

5. In a device of the class described, the combination, with the cooling-chamber, of self-closing entrance and exit doors arranged in the same admitting the passages of articles through said chamber, a continuously-running conveyer arranged in said chamber having a series of transverse cleats secured thereto adapted to convey articles from the entrance to the exit-doors of said chamber, a continuously-running conveyer arranged outside of said chamber, having a series of transverse cleats secured thereto, and adapted to convey articles into said chamber, a tray or receptacle for the articles adapted to receive articles passed through said chamber, having transverse cleats adapted to be engaged by the cleats of said conveyers, and an inclined way arranged at the delivering end of said outside conveyer, adapted to carry said tray or receptacle upward and out of engagement with the cleats of said conveyer, substantially as and for the purposes set forth.

6. The combination, with the cooling-chamber 5, having the self-closing doors 19 and 20, of the continuously-running belt 12, arranged in said chamber, the belt 10, arranged outside of said chamber, traveling continuously at a higher speed than the belt 12, and adapted to deliver its load to said belt 12, transverse cleats 14, arranged upon said belts, the tray 15, having a transverse cleat 16, adapted to be engaged by the cleats of said belt, and the incline 17, adapted to free said tray from the engaging-cleat of the belt, substantially as and for the purposes set forth.

7. In a device of the class described, the combination of the cooling-chamber, its continuously-running conveyers arranged, respectively, within and without the chamber and adjacent to each other, a tray or receptacle adapted to be carried by said conveyers, and an inclined way arranged at the delivering end of said outside conveyer adapted to carry said tray or receptacle out of engagement with the outside conveyer and in position to be engaged by the inside conveyer, substantially as described.

8. The combination, with the cooling-chamber and the outer chamber 18, having a suitable outer door and a suitable door between said chambers, of a conveyer arranged in said cooling-chamber and extending into said outer chamber and an independent conveyer extending into said outer chamber, for the purposes set forth.

In testimony whereof I have hereunto set my hand this 12th day of August, 1889.

ALFRED W. PARIS.

In presence of—
   T. D. MERWIN,
   JOHN W. ALDEN.